United States Patent
Lakkapragada et al.

(10) Patent No.: US 7,370,101 B1
(45) Date of Patent: *May 6, 2008

(54) AUTOMATED TESTING OF CLUSTER DATA SERVICES

(75) Inventors: Sekhar Lakkapragada, San Jose, CA (US); Ambujavalli Kesavan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 891 days.

This patent is subject to a terminal disclaimer.

(21) Appl. No.: 10/741,101

(22) Filed: Dec. 19, 2003

(51) Int. Cl.
    *G06F 15/173* (2006.01)
(52) U.S. Cl. ............... 709/223; 715/124; 715/174; 714/31; 714/41; 714/46
(58) Field of Classification Search ............... 709/219, 709/224, 208, 220; 714/4, 38, 124; 713/201; 702/120, 186
    See application file for complete search history.

(56) References Cited

U.S. PATENT DOCUMENTS

| | | | |
|---|---|---|---|
| 5,537,653 A | 7/1996 | Bianchini, Jr. | |
| 5,629,878 A * | 5/1997 | Kobrosly | ............... 702/120 |
| 5,909,544 A | 6/1999 | Anderson, II et al. | |
| 6,243,759 B1 | 6/2001 | Boden et al. | |
| 6,286,038 B1 | 9/2001 | Reichmeyer et al. | |
| 6,449,641 B1 | 9/2002 | Moiin et al. | |
| 6,522,995 B1 * | 2/2003 | Conti et al. | ............... 702/186 |
| 6,662,217 B1 * | 12/2003 | Godfrey et al. | ............. 709/219 |
| 6,779,134 B1 * | 8/2004 | Laviolette et al. | ............. 714/38 |
| 6,990,602 B1 * | 1/2006 | Skinner et al. | ............... 714/4 |
| 7,016,946 B2 | 3/2006 | Shirriff | |
| 2001/0034847 A1 * | 10/2001 | Gaul, Jr. | ............... 713/201 |
| 2002/0161867 A1 | 10/2002 | Cochran et al. | |
| 2003/0023680 A1 | 1/2003 | Shirriff | |
| 2003/0101243 A1 | 5/2003 | Donahue et al. | |
| 2003/0158933 A1 * | 8/2003 | Smith | ............. 709/224 |
| 2003/0172150 A1 | 9/2003 | Kennedy | |
| 2004/0243882 A1 * | 12/2004 | Zhou | ............. 714/38 |
| 2005/0114515 A1 | 5/2005 | Droms | |

* cited by examiner

*Primary Examiner*—Dustin Nguyen
(74) *Attorney, Agent, or Firm*—Darby & Darby PC; John W. Branch

(57) ABSTRACT

Methods and apparatus, including computer program products, implementing and using techniques for testing a data service on a computing cluster having several computing nodes. A test package is installed on a test administration machine and on one or more of the computing nodes in the computing cluster. Data service configuration information is collected for the data service to be tested. Computing cluster configuration information is collected. The data service configuration information and the computing cluster configuration information are distributed to one or more of the computing nodes in the computing cluster. The data service is tested on the computing cluster by applying one or more data service test suites in the test package to the data service. A report containing results of the application of one or more of the data service test suites to the data service is generated.

40 Claims, 8 Drawing Sheets

AUTOMATED TESTING OF CLUSTER DATA SERVICES

BACKGROUND

Recently the use of computing clusters and other distributed computing systems has become more popular. Computing clusters and other distributed computing systems have a number of requirements that go well beyond the requirements of stand alone computing systems. Therefore, when products are developed for use in clustered or distributed computing environments, the products typically need to be tested in the environment in which the products are to be deployed. For example, if a software product (such as an application program, a cluster resource or a database) or hardware product (such as a storage device, a processor or an interface card) is developed for use in a computing cluster, it is generally desirable to test the software or hardware product in the cluster environment before releasing such products for sale.

To facilitate the testing of computing cluster related products, test software (e.g., test programs or data service test suites) is typically written that is designed to test the product in an environment similar to the environment in which the product will be used. In the context of clustered computing, this typically requires either that the developer of the test software know a fair amount about the characteristics of the specific cluster in which the product will be deployed, or the engineer running the test to spend a lot of time installing, configuring and/or running the test software in order to execute the desired tests. Consequently, the testing of computing cluster related products is often very expensive and time consuming. Furthermore, in many cases, duplicate work is done since developers and engineers may be unaware of prior tests that have been performed for similar or identical computing cluster environments and products.

SUMMARY

In general, in one aspect, the invention provides methods and apparatus, including computer program products, implementing and using techniques for automated testing of data services in computing clusters having several computing nodes. A test package is installed on a test administration machine and on one or more of the computing nodes in the computing cluster. Data service configuration information is collected for the data service to be tested. Computing cluster configuration information is collected for the computing cluster on which the data service will be invoked. The data service configuration information and the computing cluster configuration information are distributed to one or more of the computing nodes in the computing cluster. The data service is tested on the computing cluster by applying one or more data service test suites in the test package to the data service. A report containing results of the application of one or more of the data service test suites to the data service is generated.

Implementations can include one or more of the following features. The test package can be installed on one or more client computers that are operable to interact with data service, client configuration information can be collected for the one or more clients, and the client configuration information can be distributed to one or more of the computing nodes in the computing cluster. Collecting data service configuration information can include invoking an information-gathering tool on the test administration machine to collect the data service configuration information. Collecting data service configuration information can include receiving a user input defining whether the data service is a failover data service, a scalable data service, a combination of a failover and a scalable data service, or a pre-configured data service.

The data service configuration information and the computing cluster configuration information can be distributed to one or more clients. Testing the data service can include applying one or more data service test suites in the test package to the data service using test administration machine. Testing the data service can include performing functional testing of the data service. Testing the data service can include performing fault injection testing of the data service. A user input defining which data service test suites to apply during the testing step can be received. At least some of the data service test suites can be arranged to test the data service while performing at least one of: creating and deleting resource groups, creating and deleting resources, enabling and disabling resources, bringing resource groups online and offline, enabling and disabling fault monitors for a resource, managing and unmanaging resource groups, adding and deleting resource types, switching over a resource group to a different computing node in the computing cluster, reboot failover, panic failover, failover with failback, kill application daemons, kill fault monitor daemons, and kill application daemons multiple times to cause failover. A summarized report can be generated and one or more of the report and the summarized report can be presented to the user. The data service can be a highly available data service.

In general, in another aspect, the invention provides methods and apparatus, including computer program products, implementing and using techniques for testing a data service operable to run on a computing cluster having a plurality of computing nodes. A test package can be installed on a test administration machine and on one or more of the computing nodes in the computing cluster, the test package including one or more data service test suites. A pre-defined set of data service test suites can be automatically run to test the data service, and a report indicating the outcome of the testing of the data service can be automatically generated.

Implementations can include one or more of the following features. Configuration information can be obtained automatically for the data service and the computing cluster on which the data service will be invoked. The test package can be installed on one or more client computers that interact with data service, and client configuration information can be collected for the one or more clients. Obtaining configuration information can include receiving a user input defining whether the data service is a failover data service, a scalable data service, a combination of a failover and a scalable data service, or a pre-configured data service.

Automatically running a pre-defined set of data service test suites can include applying one or more data service test suites in the test package to the data service using test administration machine. Automatically running a pre-defined set of data service test suites can include performing functional testing of the data service. The functional testing can include one or more of: automatically creating and deleting resource groups used by the data service, automatically creating and deleting resources used by the data service, automatically enabling and disabling resources used by the data service, automatically bringing resource groups used by the data service online and offline, automatically enabling and disabling fault monitors for a resource used by the data service, automatically managing and unmanaging resource groups used by the data service, automatically adding and deleting resource types after the data service has been installed, and automatically switching over a resource group used by the data service to a different computing node in the computing cluster.

Automatically running a pre-defined set of data service test suites can include performing fault injection testing of the data service. The fault injection testing can include one or more of: automatically performing reboot failover of a node in the computing cluster that is used by the data service with failback enabled, automatically performing panic failover of a node in the computing cluster that is used by the data service, automatically performing failover of a node in the computing cluster that is used by the data service, automatically kill an application daemon that is used by the data service, automatically kill a fault monitor daemon that is used by the data service, and automatically kill an application daemon that is used by the data service multiple times to cause a failover.

In general, in another aspect, the invention provides a test package for testing a data service operable to run on a computing cluster having a plurality of computing nodes. The test package includes several data service test suites for testing at least one component of the computing cluster, an information gathering tool for gathering information about the computing cluster, any clients of the computing cluster, and the data service to be tested, and a RunTest program for automatically running one or more of the data service test suites identified by the information gathering tool to test the data service.

Implementations can include one or more of the following features. The information gathering tool can receive a user input defining the computing cluster's configuration and about which data service test suites to run. The test package can include a report tool for producing a summary report that indicates whether the data service test suites identified by the information gathering tool passed or failed during the testing. The information gathering tool can receive a user input defining whether the data service is a failover data service, a scalable data service, a combination of a failover and a scalable data service, or a pre-configured data service. The data service test suites can include fault injection tests and functional tests. The RunTest program can test the data service while performing at least one of: creating and deleting resource groups, creating and deleting resources, enabling and disabling resources, bringing resource groups online and offline, enabling and disabling fault monitors for a resource, managing and unmanaging resource groups, adding and deleting resource types, switching over a resource group to a different computing node in the computing cluster, reboot failover, panic failover, failover with failback, kill application daemons, kill fault monitor daemons, and kill application daemons multiple times to cause failover.

The invention can be implemented to include one or more of the following advantages. Testing of computing cluster related products can be performed at a lower cost than what is currently possible. One set of data service test suites can be used to verify correct functionality of all data services in a computing cluster. There is no need to develop customized testing tools for different types of data service configurations. External data service developers have a tool with which they can verify that their data service implementations work correctly. The time required for verifying correct functionality of data services in computing clusters can be greatly reduced. Testing of data services in computing clusters can be performed automatically. Both normal and fault injection testing can be performed. A data service can be validated with or without having any client machines or client programs available.

The details of one or more embodiments of the invention are set forth in the accompanying drawings and the description below.

DESCRIPTION OF DRAWINGS

Like reference symbols in the various drawings indicate like elements.

DETAILED DESCRIPTION

The invention will be described below in the context of a computing cluster. Computing clusters are available from a wide range of manufacturers, such as Sun Microsystems Inc., Hewlett Packard Inc., IBM Inc., SGI Inc., and so on. In one embodiment of the invention, a Sun™Cluster computing cluster, manufactured by Sun Microsystems, Inc. of Santa Clara, Calif., can be used. However, it should be realized that the invention can be applied in other types of computing cluster environments as well, and that the scope of the invention is not limited to a particular manufacturer's computing clusters, but is instead defined by the appended claims. Furthermore, the products to be tested in the computing cluster environment will be exemplified herein by data services. Data services are typically applications that have been configured to run on a computing cluster, rather than on a single server. A data service typically includes an application, specialized computing cluster configuration files, and cluster management methods that control actions of the application, such as start, stop, and monitor (and, optionally, take corrective measures). From the user's perspective, data services are highly available, that is, if part of the computing cluster fails, other parts of the computing cluster will take over the functionality of the failed part, so that the user notices virtually no difference, except for maybe a slight performance degradation. Examples of data services include an Oracle or Sun ONE web server that are configured to run on a computing cluster.

Figure 1:
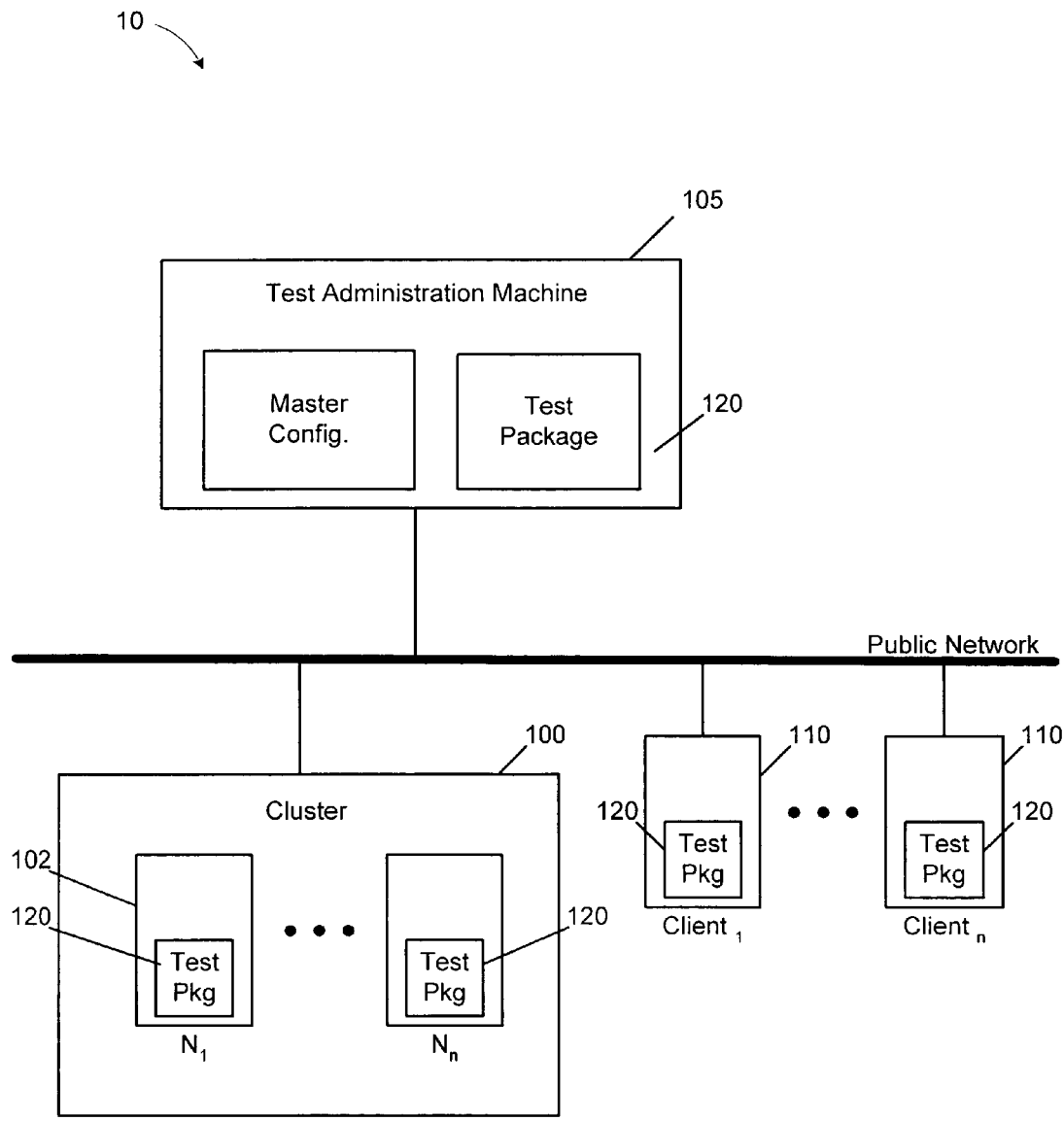
FIG. 1 is a schematic block diagram of a system that is suitable for testing products in a computing cluster environment.

As shown in FIG. 1, a test system (10) for testing products in a computing cluster environment includes a cluster (100), a test administration machine (105) and optionally one or more client machines (110). As will be appreciated by those familiar with cluster based computing, the size, topology and components of different clusters may be widely varied. At a minimum, the cluster (100) will have multiple computing nodes (102), which are typically, but not necessarily, stand-alone computer systems. The cluster (100) can include a variety of components, such as one or more storage devices, a quorum device, public network interface cards, storage interface devices, cluster interconnect devices, switches, console access devices, and so on. Some of the components, such as the storage devices and the associated storage interfaces can be provided by different vendors.

As will be seen below, the test administration machine (105) administrates the testing. For some types of tests, one or more test client machines (110) are provided that interact with the cluster (100) to simulate actual use scenarios. The number of test client machines (110) (if any) that are appropriate for a particular data service test suite can vary widely from a single test client to hundreds or more test clients, although most tests require the use of only a small number of test client machines and many do not require any test clients machines at all.

The wide variety of configurations and topologies that are possible within a cluster (100) can present challenges from a test standpoint. This is due in part because the configuration and topology of the particular test cluster (100) that will be used in a particular test may not always be known when a data service test suite is developed. The test framework, packages and methods described below can be used to facilitate more automated testing of computing clusters (100) and other distributed computing systems.

As can be seen in FIG. 1, in one implementation, a test package (120) is provided that has a number of components and can be installed on one or more of the test administration machine (105), the cluster (100), and the clients (110). The actual components that make up the test package (120) may vary widely.

Figure 2:
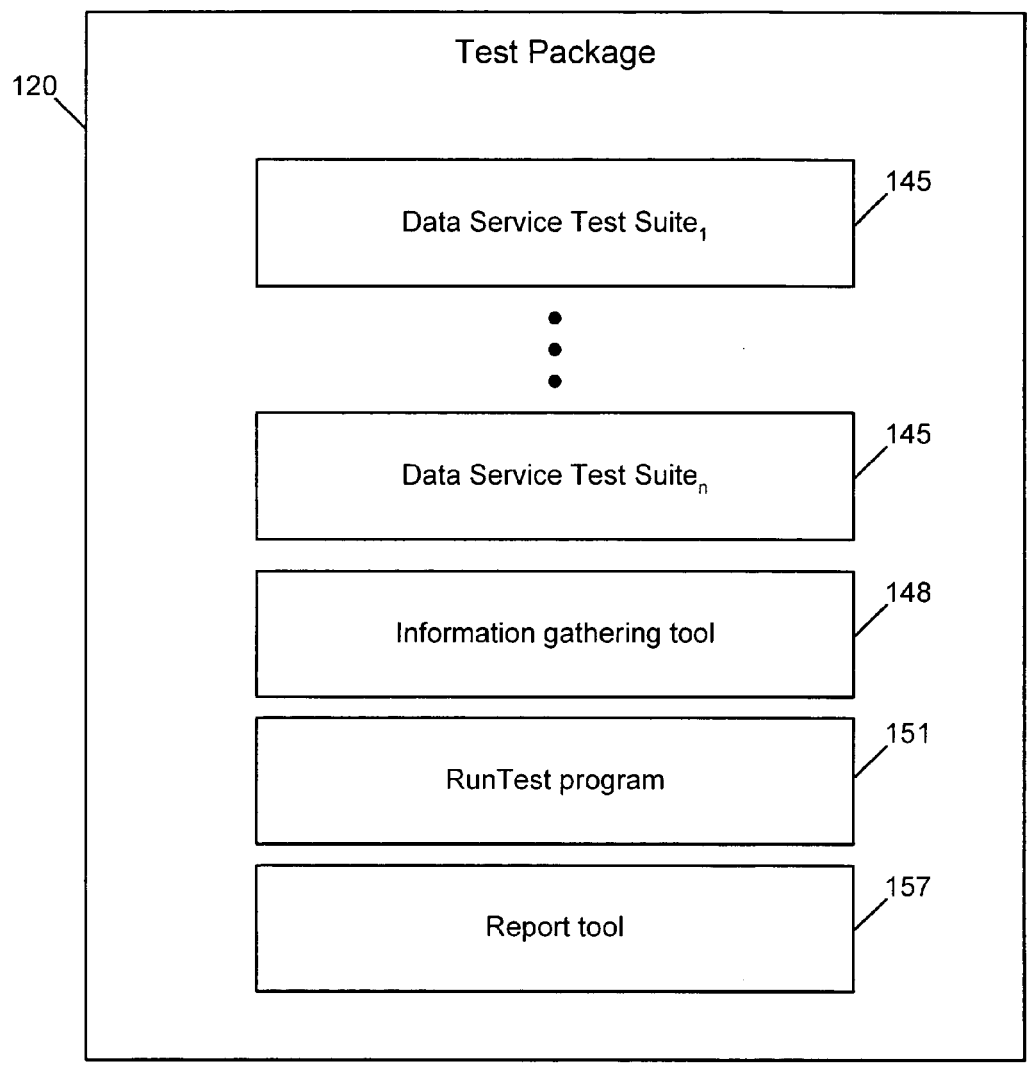
FIG. 2 is a schematic representation of an example test package.

FIG. 2 shows a more detailed view of one implementation of a test package (120), that includes several data service test suites (145), an information gathering tool (148), a RunTest program (151), and a report tool (157). In the described implementation, the information gathering tool (148) is arranged to collect any information that is required from the user to identify the cluster (100) and any client computers (110) that are part of the test system, and to permit a user to select the test(s) that they would like to run.

The described RunTest program (151) is arranged to automatically launch the selected data service test suites (145). The RunTest program (151) can also include or invoke a report tool (157) that is arranged to produce a summary report indicative of the test results. For example, the summary report can be as simple as an indication of the tests run and an indication of whether the tests passed or failed. A typical test scenario will now be described below with reference to FIGS. 3-8.

In one implementation of the invention, there are two main categories of data services that can be tested; failover data services and scalable data services. In a failover data service, the computing cluster includes a number of nodes and at any point in time, the application runs on one of the nodes. The node on which the application runs is referred to as the primary node, where as the other nodes are referred to as secondary nodes or standby nodes. The secondary nodes typically remain inactive as long as the primary node functions properly. If the primary node should fault, then the application will automatically migrate to a secondary node. This is typically referred to as automatic failover. In a scalable data service, on the other hand, the computing cluster includes multiple nodes and the application runs simultaneously on all the nodes. Together the instances of the application running on the nodes behave as a single data service from the standpoint of a remote client of that data service, and implement the functionality of the data service.

One example of a scalable data service is a web service that runs several httpd daemons on the different nodes. Any httpd daemon can serve a client request. The daemon that actually serves the client request depends on a load-balancing policy for the computing cluster. The reply to the requesting client appears to come from the data service, and not from a particular daemon that serviced the request. If one of the nodes in the scalable architecture fails, the other nodes will continue working, and the client will likely not experience any significant performance degradation. A process for testing highly available data services will now be explained.

Figure 3:
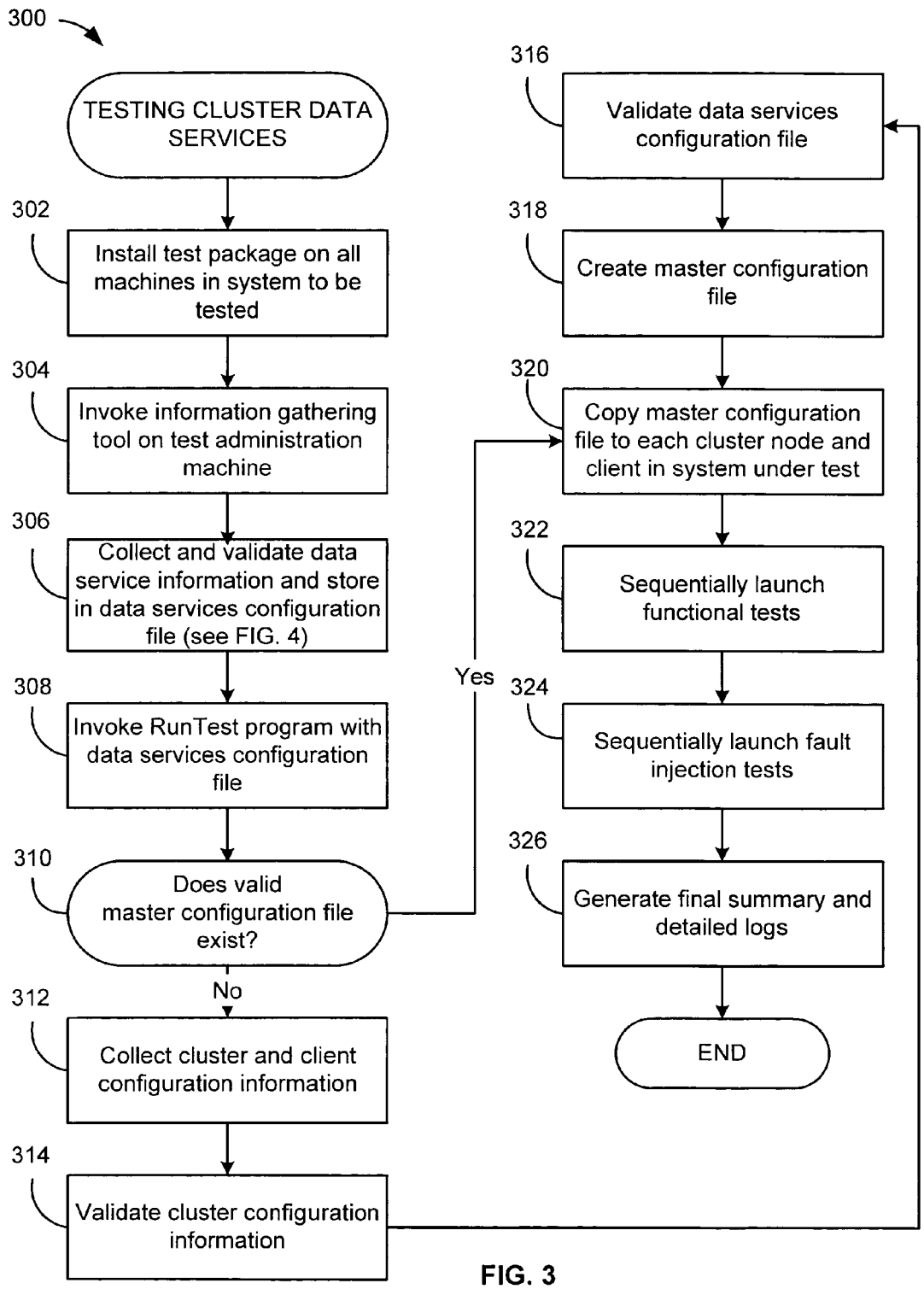
FIG. 3 is a schematic flowchart showing a process for testing products in a computing cluster environment.
Figure 4:
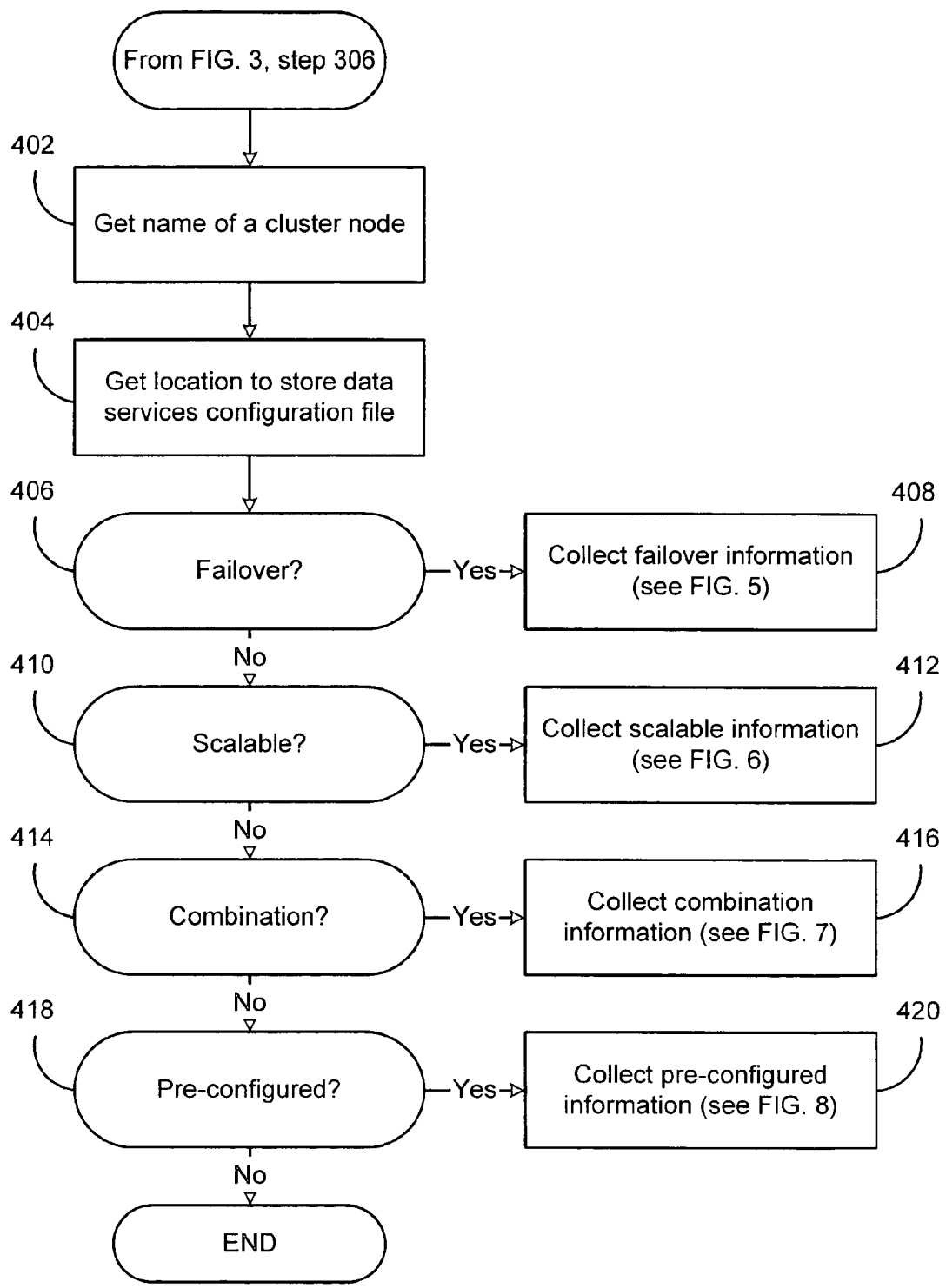
FIG. 4 is a schematic flowchart showing a more detailed view of step 306 in FIG. 3.

As shown in FIG. 3, a process (300) for testing a highly available data service begins by installing the test package on all the machines in the system to be tested (step 302), that is, the test administration machine, each node in the computing cluster and, optionally, any clients that will be involved in the testing. It should be noted that the testing can be performed without clients, unless there are specific client programs whose interaction with the computing cluster need to be tested.

An information-gathering tool is then invoked on the test administration machine (step 304), either locally, or from a remote location. The information-gathering tool collects and validates data services information for the system, and stores the collected information in a data services configuration file (step 306). Collecting data services information is in itself a complex process that will be described in further detail below with reference to FIGS. 4-8. However, very briefly, the information-gathering tool collects information about the data service to receive a user input defining whether the data service is a failover data service, a scalable data service, a combination of a failover and a scalable data service, or a pre-configured data service. The different data service types will be discussed in detail below, but for the purposes of FIG. 3, it is sufficient to know that the information gathering tool determines one out of four possible data service types for the data service under test.

After collecting the data services information and creating the data services configuration file, the process invokes a RunTest program with the data services configuration file (step 308). The process then checks whether a valid master configuration file exists (step 310). The master configuration file is created as a result of validating cluster configuration information and validating the data service configuration file, as will be seen below, and therefore typically exists only if prior tests have been performed on the same computing cluster and data service. If a master configuration file does not exist, the process needs to collect information about the system, which is accomplished in steps 312 through 318. If a master file does exist, then the process will continue directly to step 320, which will be described below. A valid master configuration file indicates that no changes have been made to the cluster configuration or the setup since the master configuration file was generated.

In step 312, the process collects cluster and client information, using a number of cluster-specific commands and operating system commands. The cluster information primarily includes information about the individual nodes in the cluster and the cluster topology. The collected cluster information is then validated by the process (step 314), followed by a validation of the data services configuration file (step 316). These validations typically entail verifying that the collected cluster information and that data services configuration information is correct, for example, by querying the different nodes and devices that are identified in order to verify that they exist, and so on. It should be noted that the order in which the data services configuration file and the cluster information is validated is insignificant, and can equally well be reversed. As a result of the validations, a master configuration file is created (step 318) by concatenating the data service configuration file and the collected cluster configuration information.

When a master configuration file exists, either from a previous test as determined in step 310, or from being created in steps 312-318, as discussed above, the process copies the master configuration file to each node in the computing cluster and to any clients in the system under test (step 320). The process then sequentially runs a series of functional test cases (step 322), followed by a series of fault injection test cases (step 324). The functional tests verify the function of the data service undergoing testing under simulated normal operating conditions. For example, a functional test may attempt to bring a resource group online and make sure the application is up and running. The fault injection tests verify the function of the data service undergoing testing under simulated abnormal operating conditions, such as failure of single components or combinations of components in the system. Both the functional test cases and the fault injection test cases will be described in further detail below.

Finally, after all the tests have been performed, the process generates a final summary and detailed logs of the test results (step 326), which completes the testing process. The logs can then be displayed to a user, who can use this information to determine whether to run a subset of diagnostic tests, or whether there are any system issues that need to be fixed. After repairing the system, the user can run the failed tests again to verify that the repair work was successful and that the system works properly.

The previous paragraphs have described the overall function of the data service test system. Next, step 306, in which data service information is collected, validated, and stored in the data services configuration file will be described in greater detail with reference to FIGS. 4-8.

Figure 5:
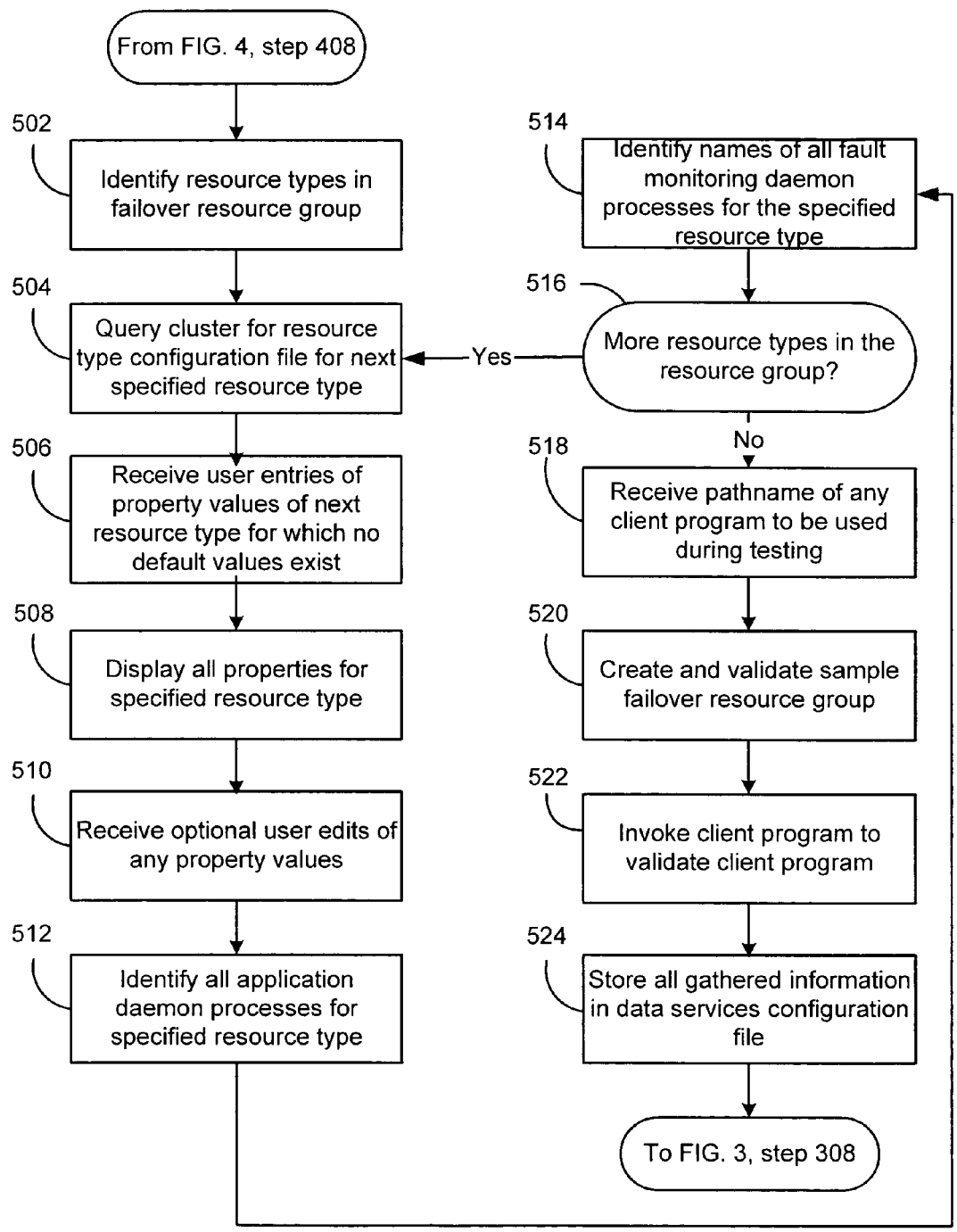
FIG. 5 is a schematic flowchart showing a more detailed view of step 408 in FIG. 4 for a failover setup.

First the process for collecting data services information obtains the name of a node in the computing cluster (step 402). Then the process obtains a location at which it the data service configuration file can be stored (step 404) after all the information has been collected. When the cluster node name and location for the data services configuration file have been determined, the process checks whether the data service to be tested is a failover data service (step 406). If the data service is a failover data service, the process collects failover information (step 408). FIG. 5 shows in greater detail how failover information is gathered in step 408.

However, before discussing FIG. 5, the concepts of resource group and resource type need to be introduced. Data services are typically configured as one or more resource groups. A resource group is the smallest unit of failover. The resource group includes one or more resources, each of which has a resource type. There can be multiple resources of the same resource type in a resource group. A resource can therefore be thought of as an instance of a resource type. Since a resource group can contain resource of several resource types, a data service will have one or more resource types. For example, a failover resource group can have a resource type for the application and a resource type for the logical hostname. Conversely, there can be two failover resource groups on the same system, but only one resource type, for example, logical hostname. As will be appreciated by those skilled in computing cluster technologies, virtually any type of dependencies can be created between resources in a resource group. Similarly, dependencies can also be created between multiple resource groups.

The reason these concepts were introduced here is that it is not sufficient only to identify whether a data service is a failover data service. It is also necessary to know what resource groups and resource types are included in the failover data service, and the interdependence between resources within a resource group, and between resource types, in order to properly test the data service. As will be seen below, for failover data services, scalable data services, and combinations thereof, the tests will involve creating and deleting resource groups, whereas for a pre-configured data service, no such creation or deletion will typically take place.

As can be seen in FIG. 5, first, the resource types in the failover resource group are identified (step 502). The process then queries the computing cluster for a resource type configuration file for the next specified resource type (step 504). The resource type configuration file is created as part of the data service installation. The resource type information includes a number of properties, some of which have default values (e.g., timeout values), and others that do not have any default values (e.g., the location on a system where an application is installed).

The process then prompts the user to enter values for all the properties of the next resource type for which no default values exist (step 506). After the user has entered the missing values, the process displays all properties for the specified resource type (step 508), including the default property values and the values input by the user in step 506. The process then gives the user the option of editing any of the displayed property values (step 510).

When values of all properties have been entered and/or changed, the process asks the user for the names of all application daemon processes for the specified resource type (step 512). This identification is necessary because terminating application daemon processes is part of the fault injection tests, and which were briefly described above with reference to step 324 of FIG. 3.

The process also asks the user to identify the names of all fault monitoring daemon processes for the specified resource type (step 514). The fault monitoring daemon processes monitor the application daemon processes that run on a particular resource type and take action if any of the application daemon processes would fail.

The process then checks whether there are more resource types in the resource group (step 516). If there are more resource types in the resource group, the process returns to step 504 and performs steps 504 through 516 until there are no more resource types in the resource group.

After all the resource types in the resource group have been identified, the user informs the process about any client programs that are to be used during the functional and fault injection testing (step 518). This can, for example, be done by specifying a path to a location of the client program, including the machine on which the client program is located and the client program name. Optionally, user information can also be included when specifying the client program, so that the program can be run as if a particular user was using the client program. The user information can describe an individual, or a class of users having specific permissions (e.g., only Oracle users can invoke Oracle client programs). Some client program also need input values of certain parameters or arguments, and if so, the user is also asked to specify these input values.

The process then creates and validates a sample failover resource group (step 520) in order to verify that all the collected information is correct and works properly. For similar reasons, the process also invokes the client program (using identified user names and input values, if any) to validate that the client program can be accessed as desired (step 522). Finally, all the gathered information is stored in the data services configuration file (step 524), which completes the collection of the failover information.

Figure 6:
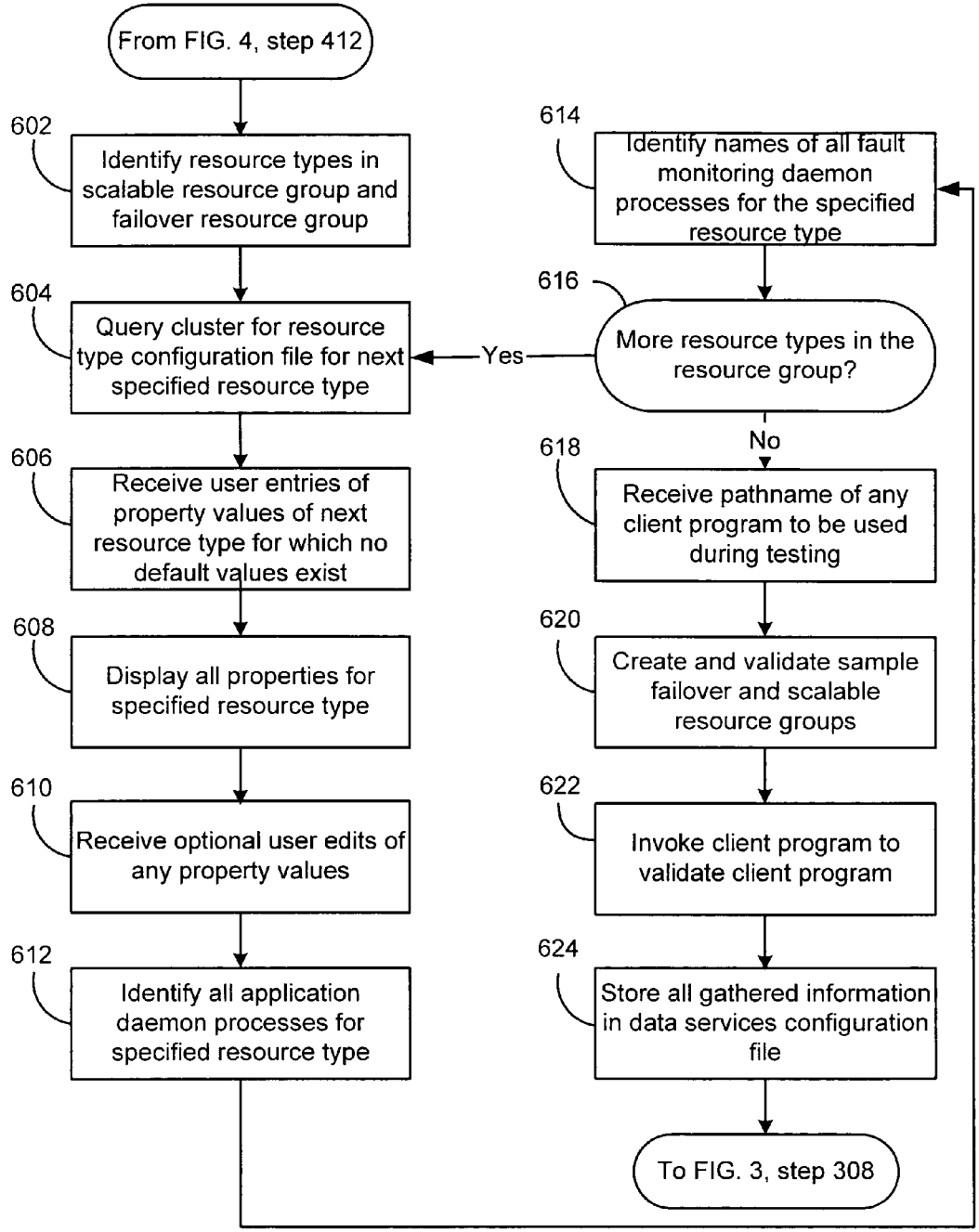
FIG. 6 is a schematic flowchart showing a more detailed view of step 412 in FIG. 4 for a scalable setup.

Returning to FIG. 4, if it is determined in step 406 that the data service is not a failover data service, the process continues to check whether the data service to be tested is a scalable data service (step 410). If the data service is a scalable data service, the process collects scalable information (step 412). FIG. 6 shows in greater detail how scalable information is gathered. In order to configure a scalable data service, there needs to be two resource groups. The first resource group is a failover resource group, which contains the logical host name resource type. The second resource group contains the resource types for the scalable data service. There is a resource group dependency between the failover resource group containing the logical hostname resource type and the scalable resource group containing the scalable resources.

As can be seen in FIG. 6, first, the resource types in the scalable resource group and failover resource group are identified (step 602). The process then queries the cluster for the resource type configuration file for the next specified resource type (step 604).

Just like in FIG. 5 above, the process then prompts the user to enter values for all the properties of the next resource type for which no default values exist (step 606). After the user has entered the missing values, the process displays all properties for the specified resource type (step 608), including the default property values and the values input by the user in step 606. The process then gives the user the option of editing any of the displayed property values (step 610).

When values of all properties have been entered and/or changed, the process asks the user for the names of all application daemon processes for the specified resource type (step 612), and all fault monitoring daemon processes for the specified resource type (step 614).

The process checks whether there are more resource types in the resource group (step 616). If there are more resource types in the resource group, the process returns to step 604 and performs steps 604 through 616 until there are no more resource types in the resource group.

After all the resource types in the resource group have been identified, the user informs the process about any client program that is to be used during the functional and fault injection testing (step 618), potentially also including a user name and input values of any arguments or parameters required.

The process then creates and validates a sample failover resource group with the shared address, and scalable resource groups with the resource types (step 620) in order to verify that all the collected information is correct and that the resource groups work properly. The process also creates a dependency between the failover resource group and the scalable resource group, as explained above. For similar reasons, the process also invokes the client program (using identified user name and input values, if any) to validate that the client program can be accessed as desired (step 622). Finally, all the gathered information is stored in the data services configuration file (step 624), which completes the collection of the scalable data service information.

Figure 7:
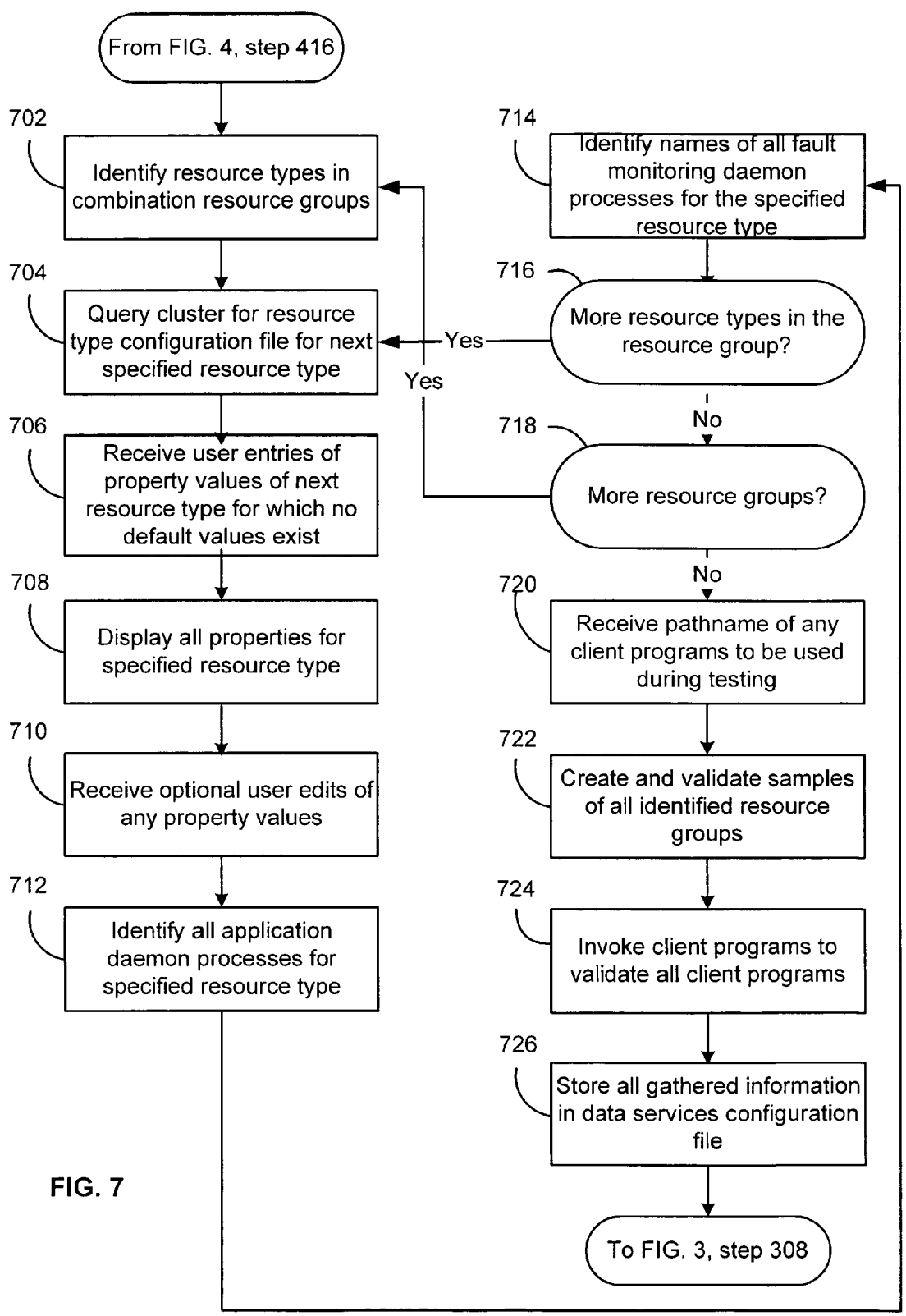
FIG. 7 is a schematic flowchart showing a more detailed view of step 416 in FIG. 4 for a combination setup.

Returning again to FIG. 4, if it is determined in step 410 that the data service is not a scalable data service, the process continues to check whether the data service to be tested is a combination of a failover and a scalable data service (step 414). If the data service is a combination data service, the process collects combination information (step 416). FIG. 7 shows in greater detail how combination information is gathered. As will be seen, the main difference compared to the failover and scalable cases, respectively, is that the process needs information about the number of available resource groups, and the resource types in each of those groups. In the failover setup, there is only one resource group, in the scalable setup, there are two resource groups, but in the combination setup, there can be any arbitrary number of resource groups.

As can be seen in FIG. 7, first, the resource types in the next resource group are identified (step 702). The process then queries the cluster for the resource type configuration file for the next specified resource type (step 704).

Just like in FIG. 5 and FIG. 6 above, the process then prompts the user to enter values for all the properties of the next resource type for which no default values exist (step 706). After the user has entered the missing values, the process displays all properties for the specified resource type (step 708), including the default property values and the values input by the user in step 706. The process then gives the user the option of editing any of the displayed property values (step 710).

When values of all properties have been entered and/or changed, the process asks the user for the names of all application daemon processes for the specified resource type (step 712), and all fault monitoring daemon processes for the specified resource type (step 714). The process checks whether there are more resource types in the resource group (step 716). If there are more resource types in the resource group, the process returns to step 704 and performs steps 704 through 716 until there are no more resource types in the resource group. Next, the process checks whether there are any more resource groups in the combination setup (step 718). If there are more resource groups, the process returns to step 702 and performs steps 702 through 718 until there are no more resource groups.

After all the resource types in all the resource groups have been identified, the user informs the process about any client programs (including user names and input values, if any) that are to be used during the functional and fault injection testing (step 720).

The process then creates and validates samples of all identified resource groups (step 722) in order to verify that all the collected information is correct and works properly. For similar reasons, the process also invokes the client programs (using identified user names and input values, if any) to validate that the client programs can be accessed as desired (step 724). Finally, all the gathered information is stored in the data services configuration file (step 726), which completes the collection of the combination information.

Figure 8:
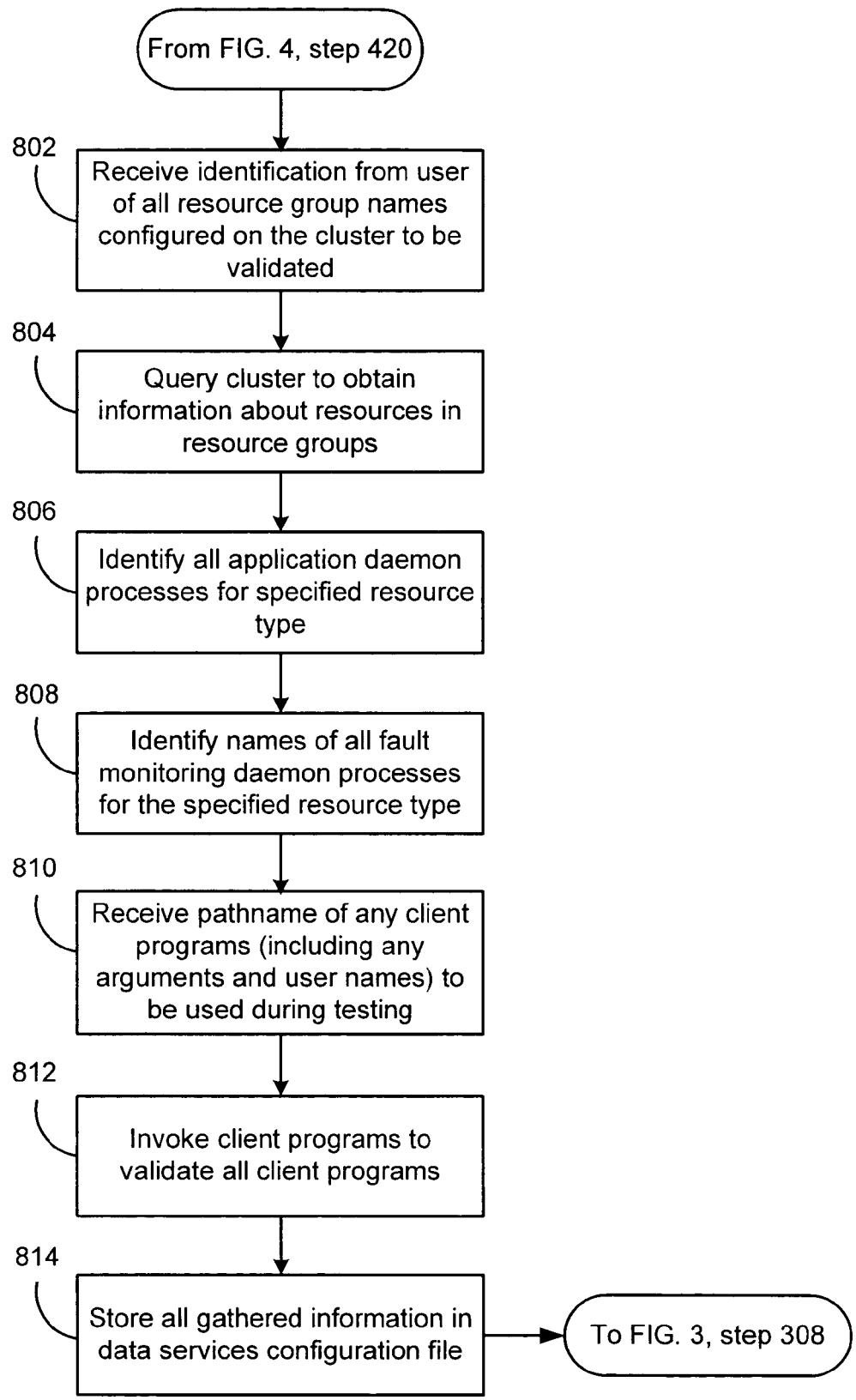
FIG. 8 is a schematic flowchart showing a more detailed view of step 420 in FIG. 4 for a pre-configured setup.

Returning again to FIG. 4, if it is determined in step 414 that the data service is not a combination data service, the process continues to check whether the data service to be tested is a pre-configured data service (step 418). If the data service is a pre-configured data service, the process collects pre-configured data service information (step 420). FIG. 8 shows in greater detail how pre-configured data service information is gathered.

As can be seen in FIG. 8, in the pre-configured data service, the user identifies all resource group names configured on the computing cluster to be validated (step 802), since the resource groups are already configured for the data service and do not need to be created or deleted during testing. The process then queries the cluster to obtain information about the resources types in the resource groups (step 804).

When information about the resource types has been obtained, the process asks the user for the names of all application daemon processes for the specified resource type (step 806), and all fault monitoring daemon processes for the specified resource type (step 808).

After all the application daemon processes and fault monitoring daemon processes have been identified, the user informs the process about any client programs that are to be used during the functional and fault injection testing (step 810).

The process then invokes the client programs (including user names and input values, if any) to validate that the client programs can be accessed as desired (step 812). Finally, all the gathered information is stored in the data services configuration file (step 814), which completes the collection of the pre-configured information, and the data service collection and validation step 306.

As can be seen from the above description, testing of failover, scalable and combination data services involves automatically creating and deleting resource groups, and so on. Thus, the data service deployment and configuration is part of the test. In contrast, pre-configured data services have already been deployed on a cluster, so the testing of pre-configured data services does not involve creating and deleting resource groups. Instead, the test automatically gathers information about resources that are already deployed and configured and verifies the functional and fault injection aspects of the already deployed data service.

As will be appreciated by those familiar with cluster based computing, a wide variety of data service test suites is needed in order to test the various operations that can be performed with a highly available data service. As was described above, in one implementation, two main classes of data service test suites can be defined: functional tests, and fault injection tests. A representative selection of data service test suites that are used in one implementation of the invention is presented below. Of course, many other types of tests or combinations of the selections of test cases below can be contemplated that are applicable for testing various types of data services.

A first group of functional data service tests suites tests the ability to create and delete resource groups. An important feature of creating a resource group is that the resource group has to be able to be created from a single node, but be visible to all other nodes in the computing cluster. Deletion of resource groups is important in order to verify that resource groups can be deleted from one node and that they are removed from all the computing cluster nodes and cannot be accessed anymore from any of the computing cluster nodes.

A second group of functional data service test suites tests the ability to add and delete resources to resource groups, for essentially the same reasons that were discussed above for the resource groups.

A third group of functional data service test suites tests the ability to enable some resources while disabling other resources for specific applications.

A fourth group of functional data service test suites tests is similar to enable and disable resources tests above, but apply to entire resource groups rather than to individual resources.

A fifth group of functional tests suites tests the ability to enable and disable fault monitors for a resource, for example, during maintenance of the resource. If no such ability exists, the fault monitor would typically try to restart a resource that is not working properly, and after a few failed attempts redirect the processes on the resource to a different node in the computing cluster.

A sixth group of functional data service test suites tests the ability to put a resource under computing cluster control and take the resource out of computing cluster control. If a failure happens while a resource is unmanaged, the data service will not react, since the data service is not responsible for managing the resource anymore. Managing and unmanaging resource groups typically occurs during data service maintenance.

A seventh group of functional data service test suites tests the ability for users to add and delete resource types after their data service has been installed, which is useful, for example, if the computing cluster is being upgraded with new nodes.

An eighth group of functional data service test suites tests the ability to forcibly switch over a data service running on one node in the computing cluster to another node in the computing cluster, for example, from a primary to a secondary node.

A first group of fault injection data service test suites tests the ability to kill a node using a reboot command and automatically transfer communications to a different node. This may be necessary, for example, to bring down a node for maintenance purposes.

A second group of fault injection data service test suites tests what happens when a node is killed in a 'non-graceful' way, which for example would be the case during a power outage.

A third group of fault injection data service test suites tests the ability to automatically switch back to a primary node after a failure of that node and subsequent rejoining of the node.

A fourth group of fault injection data service test suites tests the ability to kill individual application daemons running on different nodes of the computing cluster while still have a data service that works with very little or no disturbance, i.e. the high availability aspect of the data service application.

A fifth group of fault injection data service test suites tests the ability to automatically restart a fault-monitoring daemon if the fault-monitoring daemon were accidentally killed.

A sixth group of fault injection data service test suites simulates a fundamental problem on a node over a certain period of time, such as a repeated failure of the application, and examines how the highly available data service behaves.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood that various modifications may be made without departing from the spirit and scope of the invention. Accordingly, other embodiments are within the scope of the following claims.

What is claimed is:

1. A computer-implemented method for testing a data service operable to run on a computing cluster having a plurality of computing nodes, comprising:
    installing a test package on a test administration machine and on one or more of the computing nodes in the computing cluster;
    invoking information gathering tool on test administration machine either locally or from a remote location;
    collecting data service configuration information for the data service to be tested, wherein the data service configuration information comprises information about at least one application that is to be tested and has been configured to run on a plurality of nodes in the computer cluster, rather than on a single server, such that the running of the application on a plurality of nodes behaves as a single application;
    invoking a RunTest program operable to automatically run one or more of the data service test suites identified by the information gathering tool to test the data service;
    determining whether a valid master configuration file exists;
    collecting computing cluster configuration information for the computing cluster on which the data service will be invoked if the valid master configuration file does not exist;
    distributing the data service configuration information and the computing cluster configuration information to one or more of the computing nodes in the computing cluster;
    testing the data service on the computing cluster by applying one or more data service test suites in the test package to the data service; and
    generating a report containing results of the application of one or more of the data service test suites to the data service.

2. The method of claim 1, further comprising:
    installing the test package on one or more client computers that are operable to interact with data service;
    collecting client configuration information for the one or more clients; and
    distributing the client configuration information to one or more of the computing nodes in the computing cluster.

3. The method of claim 1, wherein collecting data service configuration information includes:
    invoking an information-gathering tool on the test administration machine to collect the data service configuration information.

4. The method of claim 1, wherein collecting data service configuration information includes:
    receiving a user input defining whether the data service is a failover data service, a scalable data service, a combination of a failover and a scalable data service, or a preconfigured data service.

5. The method of claim 2, further comprising:
    distributing the data service configuration information and the computing cluster configuration information to one or more clients.

6. The method of claim 1, wherein testing the data service comprises:
    applying one or more data service test suites in the test package to the data service using test administration machine.

7. The method of claim 1, wherein testing the data service comprises:
    performing functional testing of the data service.

8. The method of claim 1, wherein testing the data service comprises:
    performing fault injection testing of the data service.

9. The method of claim 1, further comprising:
    receiving a user input defining which data service test suites to apply during the testing step.

10. The method of claim 1, wherein at least some of the data service test suites are arranged to test the data service while performing at least one of:
    creating and deleting resource groups, creating and deleting resources, enabling and disabling resources, bringing resource groups online and offline, enabling and disabling fault monitors for a resource, managing and unmanaging resource groups, adding and deleting resource types, switching over a resource group to a different computing node in the computing cluster, reboot failover, panic failover, failover with failback, kill application daemons, kill fault monitor daemons, and kill application daemons multiple times to cause failover.

11. The method of claim 1, further comprising:
    generating a summarized report; and
    presenting one or more of the report and the summarized report to the user.

12. The method of claim 1, wherein the data service is a highly available data service.

13. A computer program product, stored on a machine-readable medium, comprising instructions operable to cause a computer to:
    install a test package on a test administration machine and on one or more of the computing nodes in the computing cluster;
    invoking information gathering tool on test administration machine either locally or from a remote location;
    collect data service configuration information for the data service to be tested, wherein the data service configuration information comprises information about at least one application that is to be tested and has been configured to run on a plurality of nodes in the computer cluster, rather than on a single server, such that the running of the application on a plurality of nodes behaves as a single application;

invoking a RunTest program operable to automatically run one or more of the data service test suites identified by the information gathering tool to test the data service;

determining whether a valid master configuration file exists;

collect computing cluster configuration information for the computing cluster on which the data service will be invoked if the valid master configuration file does not exist;

distribute the data service configuration information and the computing cluster configuration information to one or more of the computing nodes in the computing cluster;

test the data service on the computing cluster by applying one or more data service test suites in the test package to the data service; and generate a report containing results of the application of one or more of the data service test suites to the data service.

14. The computer program product of claim 13, further comprising instructions to:

install the test package on one or more client computers that are operable to interact with data service;

collect client configuration information for the one or more clients; and distribute the client configuration information to one or more of the computing nodes in the computing cluster.

15. The computer program product of claim 13, wherein the instructions to collect data service configuration information include instructions to:

invoke an information-gathering tool on the test administration machine to collect the data service configuration information.

16. The computer program product of claim 13, wherein the instructions to collect data service configuration information include instructions to:

receive a user input defining whether the data service is a failover data service, a scalable data service, a combination of a failover and a scalable data service, or a preconfigured data service.

17. The computer program product of claim 14, further comprising instructions to:

distribute the data service configuration information and the computing cluster configuration information to one or more clients.

18. The computer program product of claim 13, wherein the instructions to test the data service comprise instructions to:

apply one or more data service test suites in the test package to the data service using test administration machine.

19. The computer program product of claim 13, wherein the instructions to test the data service comprise instructions to:

perform functional testing of the data service.

20. The computer program product of claim 13, wherein instructions to test the data service comprise instructions to:

perform fault injection testing of the data service.

21. The computer program product of claim 13, further comprising instructions to:

receive a user input defining which data service test suites to apply during the testing step.

22. The computer program product of claim 13, wherein at least some of the data service test suites are arranged to test the data service while performing at least one of:

creating and deleting resource groups, creating and deleting resources, enabling and disabling resources, bringing resource groups online and offline, enabling and disabling fault monitors for a resource, managing and unmanaging resource groups, adding and deleting resource types, switching over a resource group to a different computing node in the computing cluster, reboot failover, panic failover, failover with failback, kill application daemons, kill fault monitor daemons, and kill application daemons multiple times to cause failover.

23. The computer program product of claim 13, further comprising instructions to:

generate a summarized report; and present one or more of the report and the summarized report to the user.

24. The computer program product of claim 13, wherein the data service is a highly available data service.

25. A computer-implemented method for testing a data service operable to run on a computing cluster having a plurality of computing nodes, comprising:

installing a test package on a test administration machine and on one or more of the computing nodes in the computing cluster, the test package including one or more data service test suites;

invoking information gathering tool on test administration machine either locally or from a remote location;

collect data service configuration information for the data service to be tested invoking a RunTest program operable to automatically run one or more of the data service test suites identified by the information gathering tool to test the data service;

determining whether a valid master configuration file exists;

distribute the data service configuration information to one or more of the computing nodes in the computing cluster;

automatically running a pre-defined set of data service test suites to test the data service wherein the data service comprises at least one application that is to be tested and has been configured to run on a plurality of nodes in the computer cluster, rather than on a single server, such that the running of the application on a plurality of nodes behaves as a single application; and automatically generating a report indicating the outcome of the testing of the data service.

26. The method of claim 25, further comprising:

obtaining configuration information for the data service and the computing cluster on which the data service will be invoked.

27. The method of claim 25, further comprising:

installing the test package on one or more client computers that are operable to interact with data service; and collecting client configuration information for the one or more clients.

28. The method of claim 26, wherein obtaining configuration information includes:

receiving a user input defining whether the data service is a failover data service, a scalable data service, a combination of a failover and a scalable data service, or a preconfigured data service.

29. The method of claim 25, wherein automatically running a pre-defined set of data service test suites:
applying one or more data service test suites in the test package to the data service using test administration machine.

30. The method of claim 25, wherein automatically running a pre-defined set of data service test suites comprises:
performing functional testing of the data service.

31. The method of claim 30, wherein performing functional testing comprises one or more of: automatically creating and deleting resource groups used by the data service, automatically creating and deleting resources used by the data service, automatically enabling and disabling resources used by the data service, automatically bringing resource groups used by the data service online and offline, automatically enabling and disabling fault monitors for a resource used by the data service, automatically managing and unmanaging resource groups used by the data service, automatically adding and deleting resource types after the data service has been installed, and automatically switching over a resource group used by the data service to a different computing node in the computing cluster.

32. The method of claim 25, wherein automatically running a pre-defined set of data service test suites comprises:
performing fault injection testing of the data service.

33. The method of claim 32, wherein performing fault injection testing comprises one or more of: automatically performing reboot failover of a node in the computing cluster that is used by the data service with failback enabled, automatically performing panic failover of a node in the computing cluster that is used by the data service, automatically performing failover of a node in the computing cluster that is used by the data service, automatically kill an application daemon that is used by the data service, automatically kill a fault monitor daemon that is used by the data service, and automatically kill an application daemon that is used by the data service multiple times to cause a failover.

34. The method of claim 25, wherein the data service is a highly available data service.

35. A test package for testing a data service encoded on a computer readable storage media and operable to run on a computing cluster having a plurality of computing nodes, comprising:
a plurality of data service test suites, each data service test suite being operable to test at least one component of the computing cluster;
an information gathering tool operable to receive information about the computing cluster, any clients of the computing cluster, and the data service to be tested, wherein the data service comprises at least one application that is to be tested and has been configured to run on a plurality of nodes in the computer cluster, rather than on a single server, such that the running of the application on a plurality of nodes behaves as a single application; and
a RunTest program operable to automatically run one or more of the data service test suites identified by the information gathering tool to test the data service; and
a report tool operable to produce a summary report indicative of the test results.

36. The test package of claim 35, wherein the information gathering tool is operable to receive a user input defining the computing cluster's configuration and about which data service test suites to run.

37. The test package of claim 35, further comprising:
a report tool operable to produce a summary report that indicates whether the data service test suites identified by the information gathering tool passed or failed during the testing.

38. The test package of claim 35, wherein:
the information gathering tool further is operable to receive a user input defining whether the data service is a failover data service, a scalable data service, a combination of a failover and a scalable data service, or a pre-configured data service.

39. The test package of claim 35, wherein:
the data service test suites include fault injection tests and functional tests.

40. The test package of claim 39, wherein:
the RunTest program is operable to test the data service while performing at least one of: creating and deleting resource groups, creating and deleting resources, enabling and disabling resources, bringing resource groups online and offline, enabling and disabling fault monitors for a resource, managing and unmanaging resource groups, adding and deleting resource types, switching over a resource group to a different computing node in the computing cluster, reboot failover, panic failover, failover with failback, kill application daemons, kill fault monitor daemons, and kill application daemons multiple times to cause failover.

* * * * *